US006493700B2

(12) United States Patent
Couch et al.

(10) Patent No.: US 6,493,700 B2
(45) Date of Patent: Dec. 10, 2002

(54) SYSTEM AND METHOD FOR SPECIFYING CUSTOM QUALIFIERS FOR EXPLAIN TABLES

(75) Inventors: Tanya Couch, San Jose, CA (US); Catherine Elizabeth Wuebker Drummond, Morgan Hill, CA (US); Virginia Walbridge Hughes, Jr., Hollister, CA (US); Theresa Hsing Lai, Saratoga, CA (US); Joseph Davis Lea, III, Chapel Hill, NC (US); David Harold Oberstadt, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/540,838

(22) Filed: Mar. 31, 2000

(65) Prior Publication Data

US 2002/0049700 A1 Apr. 25, 2002

Related U.S. Application Data

(63) Continuation-in-part of application No. 08/949,636, filed on Oct. 14, 1997, now Pat. No. 6,243,703.

(51) Int. Cl.[7] .............................................. G06F 17/30
(52) U.S. Cl. ................... 707/2; 707/1; 707/4; 707/102; 707/104.1
(58) Field of Search .......................... 707/1, 2, 4, 102, 707/104, 104.1

(56) References Cited

U.S. PATENT DOCUMENTS

| 5,345,585 A | | 9/1994 | Iyer et al. ....................... 707/2 |
|---|---|---|---|
| 5,387,675 A | | 11/1994 | Cheng et al. ................... 707/2 |
| 5,511,190 A | * | 4/1996 | Sharma et al. ................. 707/1 |
| 5,544,355 A | * | 8/1996 | Chaudhuri et al. ............ 707/2 |
| 5,761,494 A | | 6/1998 | Smedley et al. ................ 707/4 |
| 5,778,379 A | | 7/1998 | Blackman et al. ...... 707/103 R |
| 5,826,076 A | | 10/1998 | Bradley et al. ................. 707/4 |
| 5,842,209 A | | 11/1998 | Mocek et al. ................... 707/4 |
| 5,862,378 A | | 1/1999 | Wang et al. ................. 717/114 |
| 5,930,785 A | * | 7/1999 | Lohman et al. ................. 707/2 |
| 5,940,819 A | * | 8/1999 | Beavin et al. .................. 707/2 |
| 5,960,426 A | * | 9/1999 | Pirahesh et al. ................ 707/3 |

OTHER PUBLICATIONS

Method for Optimizing for N Rows in a Database Management System, IBM Technical Disclosure Bulletin vol. 38 No. 12 Dec. 1995, 317.
Multiple Indexed Access Path in a Relational Database System, IBM Technical Disclosure Bulletin vol. 32 No. 10B Mar. 1990, 388–392.
Access Path Selection in a Relational Database Management System, IBM Technical Disclosure Bulletin vol. 22 No. 4 Sep. 1979, 1657–1660.
DB2 Cost Formula, IBM Technical Disclosure Bulletin vol. 34 No. 12 May 1992, 389–394.

* cited by examiner

Primary Examiner—Greta L. Robinson
(74) Attorney, Agent, or Firm—Brian C. Kunzler

(57) ABSTRACT

A system and method for specifying custom qualifiers for explain tables allows a user to designate selected explain tables for which the user wishes to view statements. A query explain program is provided and configured with an explain table qualifier designation module for receiving a user designation of a query explain table to reference. The user selects a function of the query explain program to perform and then designates the qualifier of the query explain table to be referenced. The function is then performed in conjunction with the contents of the selected query explain table.

22 Claims, 11 Drawing Sheets

```
SELECT T1.NAME, T1.DEPT
  FROM T1, T2, T3
    WHERE T1.SALARY = T2.SALARY
    AND T2.DEPT = T3.DEPT
    AND T1.SALARY =
        (SELECT INCOME FROM T4
        WHERE LOCATION = STL)
```

RDBMS
54

74

| | | | | | |
|---|---|---|---|---|---|
| QUERYNO | 214 | 214 | 214 | 214 | etc. |
| QBLOCKNO | 1 | 1 | 1 | 2 | |
| APPLNAME | PLAN1 | PLAN1 | PLAN1 | PLAN2 | |
| PROGNAME | DNSEMPL1 | DNSEMPL1 | DNSEMPL1 | DNSEMPL1 | |
| PLANNO | 1 | 2 | 3 | 1 | |
| METHOD | 0 | 1 | 1 | 1 | |
| TNAME | T1 | T2 | T3 | T4 | |
| TABNO | 1 | 2 | 3 | 1 | |
| ACCESSTYPE | I | I | I | R | |
| MATCHCOLS | 1 | 1 | 1 | 1 | |
| ACCESSNAME | IDX1 | IDX2 | IDX3 | IDX4 | |
| INDEXONLY | N | Y | Y | N | |
| SORTN_UNIQ | N | N | N | N | |
| SORTN_JOIN | N | N | N | N | |
| SORTN_ORDERBY | N | N | N | N | |
| SORTN_GROUPBY | N | N | N | N | |
| SORTC_UNIQ | N | N | N | N | |
| SORTC_JOIN | N | N | N | N | |
| SORTC_ORDERBY | N | N | N | N | |
| SORTC_GROUPBY | N | N | N | N | |
| PREFETCH | L | | | | |
| MIXOPSEQ | 0 | 0 | 0 | 0 | | etc.

Fig. 4

SYSTEM AND METHOD FOR SPECIFYING CUSTOM QUALIFIERS FOR EXPLAIN TABLES

RELATED APPLICATIONS

This application is a continuation-in-part of and claims priority to U.S. patent application Ser. No. 08/949,636 now U.S. Pat. No. 6,243,703, filed Oct. 14, 1997, for "Interpreting Data Using a Graphical User Interface," which is incorporated herein by reference.

BACKGROUND OF THE INVENTION

IDENTIFICATION OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. The Field of the Invention

The present invention relates generally to computer-implemented database systems. More specifically, the present invention relates to a system and method for specifying custom qualifiers for explain tables in a computer-implemented database system.

2. The Relevant Technology

Databases are computerized information storage and retrieval systems. A Relational Database Management System (RDBMS) is a database system which uses relational techniques for storing and retrieving data. Relational databases are organized into tables consisting of rows (tuples) and columns of data. A database typically includes many tables, and each table includes multiple rows and columns. The tables are conventionally stored in direct access storage devices (DASD), such as magnetic or optical disk drives, for semi-permanent storage.

Generally, users communicate with an RDBMS using a Structured Query Language (SQL) interface. The SQL interface allows users to create, manipulate, and query a database by formulating relational operations on the tables, either interactively, in batch files, or embedded in host languages such as C and COBOL. SQL has evolved into a standard language for RDBMS software and has been adopted as such by both the American National Standards Institute (ANSI) and the International Standards Organization (ISO).

The SQL standard provides that each RDBMS should respond to a particular query in the same way, regardless of the underlying database. However, the method that the RDBMS actually uses to find the requested information in the database is left to the RDBMS. Typically, there is more than one method that can be used by the RDBMS to access the requested data. The RDBMS, therefore, attempts to select the method that minimizes the computer time and resources (i.e. cost) for executing the query.

The RDBMS determines how to execute the SQL statements. The set of steps created by the RDBMS for executing the SQL statements is commonly referred to as the "access path." In other words, the access path is a sequence of operations used by the RDBMS to obtain the data requested by the SQL query. Depending on the access path, an SQL statement might search an entire table space, or, alternatively, it might use an index. The access path is the key to determining how well an SQL statement performs.

The description of the access path is stored in a plan table, which typically stores the access path data for a plurality of SQL statements.

In addition to determining the access path, some databases estimate the cost for executing each SQL statement. The estimated costs are typically stored in a statement table (as in the case of DB2® for OS/390®) or a similar table within the database. Like the plan table, the statement table stores the estimated statement costs for a plurality of SQL statements.

Databases also typically include statistics for such database objects as table spaces, indexes, tables, and columns. For example, in the case of a table, the statistical data may include the number of pages that contain rows of the table, the number of rows and columns in the table, as well as various other statistical data. The statistics are typically derived from the RDBMS "catalog," which is an object that describes the entire database.

The above-described access path data, statement cost data, and object statistics data (referred to collectively as "query explain data") assist the user in analyzing and improving the performance of SQL statements. For example, a query with a higher-than-average statement cost might alert the user to inefficiencies in the access path. By viewing the access path data, the user can selectively make changes to the query and/or the database, such as by adding an index in order to avoid a table space scan. The object statistics data similarly assists the user by describing the structure and organization of the database.

Unfortunately, analyzing SQL query performance is currently too time-consuming and complex for the average user. Typical systems include hundreds or thousands of query statements. Identifying the one or more statements that need to be improved can be a difficult task. In conventional systems, the user must manually locate the relevant query explain data in a plurality of tables, e.g. the plan table, the statement table, the function table, and the catalog tables, which can be tedious and time-consuming.

Moreover, each of the tables typically stores information corresponding to many different statements and objects. Consequently, the tables are often very large, making it difficult to locate the desired data. Likewise, the tables are often cryptic and hard to understand, even for database experts. For example, the plan table typically includes sixty or more columns and hundreds or thousands of rows. The access path data is stored in a tabular format, which, although easily understood by the RDBMS, is often too complicated to be effectively analyzed.

Furthermore, the query statements to be filtered are typically included in a number of packages and plans. A package is a collection of query statements found in a single application program. A plan is also a collection of query statements, but may include statements from one or more application programs. In large-scale database systems, the number of plans and packages is correspondingly large. Thus, a difficulty arises when trying to locate a particular package or plan for purposes of analyzing the query statements contained therein.

Similarly, query explain tables can become extremely large. Accordingly, different query explain tables may be used for each package or for each plan. In one arrangement commonly used, each individual user within a database system is assigned a unique label and all packages and plans generated by the user employ one or more query explain tables unique to the user. The label given the user is known as a high level qualifier. The high level qualifier is generally a part of a naming system or convention in which a portion of the label, typically the beginning portion, references the maker or user, and subsequent portions identify the type of the component being labeled.

Currently under this arrangement, query explain tables assigned to a user are automatically assigned the user's high level qualifier at the time of binding of the query explain tables. When a user wishes to reference query explain data, the query explain program determines who the user is, typically by requesting that the user designating his high level qualifier, and automatically calls up query explain tables and other query explain data corresponding to the user's high level qualifier.

Problems arise when the user wishes to name a query explain table with a labels other than the user's high level qualifier. Current query explain programs do not have the flexibility to allow a user to do so, nor do they allow a user to individually access user-named tables. Additionally, if a user wishes to examine query explain data generated by another user, for instance, where a system administrator desires to ascertain where slowdowns in a database are occurring, the user is unable to individually reference the query explain tables generated by others while logged in under the user's own account. Accordingly, when a user wishes to reference explain tables that were not generated under the user's high level qualifier or other user code, the user is forced to log out and log in under the account corresponding to the user code of the tables that are desired to be referenced.

In accordance with the above discussion, it should be readily appreciated that a need exists for a query explain system that allows users to designate the labels of query explain tables. What is similarly needed is a manner of allowing users, from within a query explain program, to reference a selected query explain table other than the default table using the particular high level qualifier or other label of the query explain table.

SUMMARY OF THE INVENTION

The present invention solves the foregoing problems by providing a system, method, and article of manufacture for specifying a custom qualifier for a query explain table. In disclosed embodiments, query explain tables are assigned custom qualifiers, and users are allowed to reference any query explain tables for which they are granted access privileges by specifying the qualifier or other identifier of the query explain table the user wishes to access.

In one aspect of the invention, an apparatus for accessing a user-selectable query explain table includes therein modules of operational data and executable code for execution by the processor. In one embodiment, the modules include a query explain program for relaying information regarding query execution to a user. Preferably, the query explain program is configured to access one or more query explain tables generated in accordance with operation of the database system.

Preferably, the modules also comprise an explain table qualifier designation module communicating with the query explain program and configured to receive a user designation of a selected query explain table to be accessed by the query explain program. The modules may also comprise an explain table access module configured to access the selected query explain table in response to the user designation.

In one embodiment, the user designation of the selected query explain table comprises the designation of a high level qualifier uniquely identifying the selected query explain table. The high level qualifier may identify a maker of the explain table.

Additionally, the explain table qualifier designation module may comprise a window accessible from the query explain program. Preferably, the window comprises a control mechanism for receiving the user designation of a selected query explain table.

The query explain table may comprise a plan table, a statement table, a function table, or other types of query explain data. The query explain table is preferably accessed by the query explain program for a plurality of different functions including displaying query access path data to the user.

In another aspect of the invention, a method of accessing a user-selectable query explain table includes a step of receiving within a query explain program a user designation of a selected query explain table generated in accordance with operation of the database system. The method also preferably comprises referencing the selected query explain table in response to receiving the user designation of the selected query explain table.

The method may also comprise generating the selected query explain table and assigning the query explain table a user-generated high level qualifier. In one embodiment, the query explain table is selected from the group consisting of a plan table, a statement table, and a function table. Additionally, referencing the selected query explain table may comprise automatically referencing the selected query explain table in order to achieve a function of the query explain program. The function may comprise displaying query access path data to the user.

The method may further comprise generating a graphical user interface (GUI) window accessible from the query explain program, the GUI window comprising a control mechanism for receiving the user designation of a selected query explain table. In one embodiment, receiving a user designation of a selected query explain table comprises receiving a high level qualifier uniquely identifying the selected query explain table. Additionally, the high level qualifier may designate a maker of the query explain table.

In yet another aspect of the invention, an article of manufacture comprises a program storage medium readable by a processor and embodying one or more instructions executable by the processor to perform the above-described method for filtering a plurality of groups of query statements according to associated identification data.

These and other objects, features, and advantages of the present invention will become more fully apparent from the following description and appended claims, or may be learned by the practice of the invention as set forth hereinafter.

BRIEF DESCRIPTION OF THE DRAWINGS

These and other more detailed and specific objects and features of the present invention are more fully disclosed in the following specification, reference being had to the accompanying drawings, in which

FIG. 4 is an illustration of a query statement and a portion of a plan table according to one embodiment of the invention.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, may be arranged and designed in a wide variety of different configurations. Thus, the following more detailed description of the embodiments of the apparatus, system, and method of the present invention, as represented in the Figures, is not intended to limit the scope of the invention, as claimed, but is merely representative of presently preferred embodiments of the invention.

The Figures include schematic block diagrams and flow chart diagrams which illustrate in more detail the preferred embodiments of the present invention. The schematic block diagrams illustrate certain embodiments of modules for performing various functions of the present invention. In general, the represented modules include therein executable and operational data for operation within a computer system of FIG. 1 in accordance with the present invention.

As used herein, the term executable data, or merely an "executable," is intended to include any type of computer instructions and computer executable code that may be located within a memory device and/ or transmitted as electronic signals over a system bus or network. An identified module of executable code may, for instance, comprise one or more physical or logical blocks of computer instructions which may, for instance, be organized as an object, procedure, or function. Nevertheless, the executables of an identified module need not be located together, but may comprise disparate instructions stored in different locations which together comprise the module and achieve the purpose stated for the module. Indeed, an executable may be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices, and may at least partially exist merely as electronic signals on a system bus or network.

Figure 1:
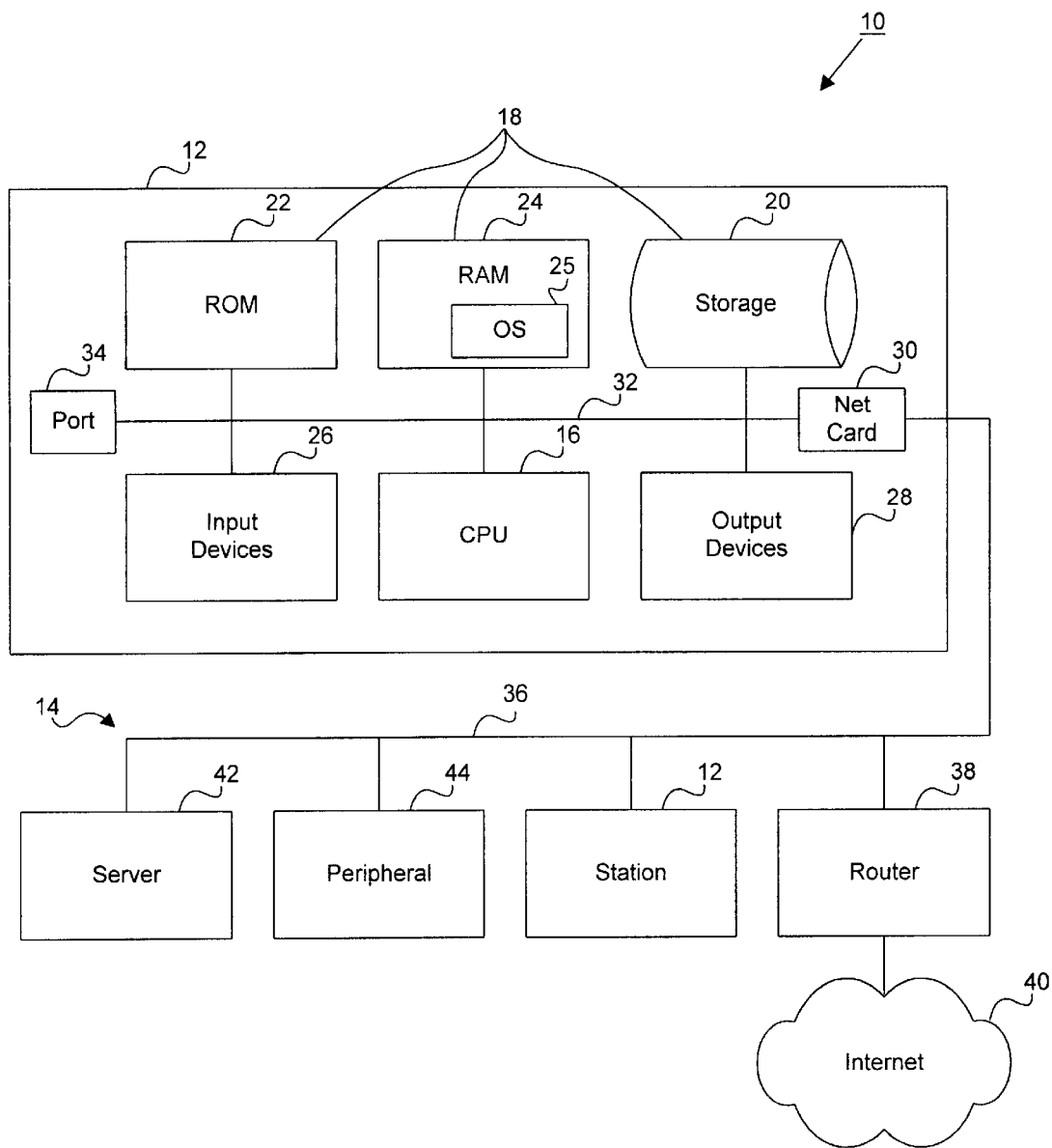
FIG. 1 is a schematic block diagram of a computer system suitable for implementing one embodiment of the invention.

FIG. 1 is a schematic block diagram that illustrates a computer system 10 in which executable and operational data, operating in accordance with the present invention, may be hosted on one or more computer stations 12 in a network 14. The network 14 may comprise a wide area network (WAN) or local area network (LAN) and may also comprise an interconnected system of networks, one particular example of which is the Internet and the World Wide Web supported on the Internet.

A typical computer station 12 may include a processor or CPU 16. The CPU 16 may be operably connected to one or more memory devices 18. The memory devices 18 are depicted as including a non-volatile storage device 20 such as a hard disk drive or CD-ROM drive, a read-only memory (ROM) 22, and a random access volatile memory (RAM) 24. Preferably, the computer station 12 operates under the control of an operating system (OS) 25, such as MVS®, OS/390®, AIX®, OS/2®, WINDOWS NT®, WINDOWS®, UNIX®, and the like.

The computer station 12 or system 10 in general may also include one or more input devices 26, such as a mouse or keyboard, for receiving inputs from a user or from another device. Similarly, one or more output devices 28, such as a monitor or printer, may be provided within or be accessible from the computer system 10. A network port such as a network interface card 30 may be provided for connecting to outside devices through the network 14. In the case where the network 14 is remote from the computer station, the network interface card 30 may comprise a modem, and may connect to the network 14 through a local access line such as a telephone line.

Within any given station 12, a system bus 32 may operably interconnect the CPU 16, the memory devices 18, the input devices 26, the output devices 28 the network card 30, and one or more additional ports 34. The system bus 32 and a network backbone 36 may be regarded as data carriers. As such, the system bus 32 and the network backbone 36 may be embodied in numerous configurations. For instance, wire, fiber optic line, wireless electromagnetic communications by visible light, infrared, and radio frequencies may be implemented as appropriate.

In general, the network 14 may comprise a single local area network (LAN), a wide area network (WAN), several adjoining networks, an intranet, or as in the manner depicted, a system of interconnected networks such as the Internet 40. The individual stations 12 communicate with each other over the backbone 36 and/or over the Internet 40 with varying degrees and types of communication capabilities and logic capability. The individual stations 12 may include a mainframe computer on which the modules of the present invention may be hosted.

Different communication protocols, e.g., ISO/OSI, IPX, TCP/IP, may be used on the network, but in the case of the Internet, a single, layered communications protocol (TCP/IP) generally enables communications between the differing networks 14 and stations 12. Thus, a communication link may exist, in general, between any of the stations 12.

The stations 12 connected on the network 14 may comprise application servers 42, and/or other resources or peripherals 44, such as printers and scanners. Other networks may be in communication with the network 14 through a router 38 and/or over the Internet 40.

Figure 2:
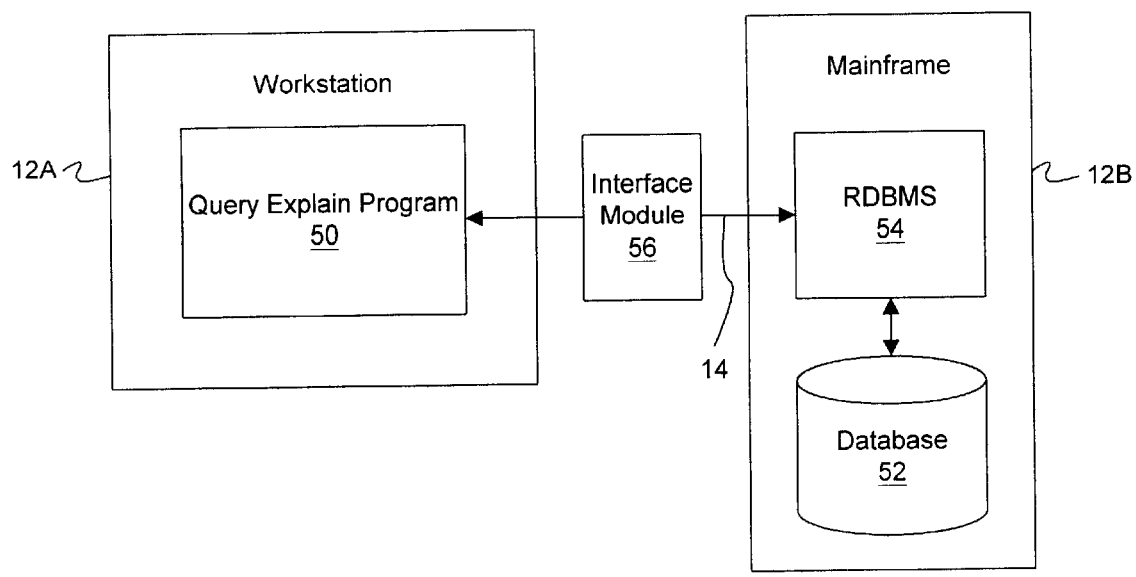
FIG. 2 is a schematic block diagram of a system for filtering query statements according to user-defined filters of query explain data according to one embodiment of the invention.

Referring now to FIG. 2, a schematic block diagram of one embodiment of the present invention includes first and second stations 12A, 12B. The first station is preferably a workstation-class computer, such as an PC workstation, available from IBM Corporation. The second station 12B is preferably an IBM mainframe computer operating under MVS® or OS/390®. In one embodiment, the stations 12A, 12B are coupled via a network 14 using a distributed remote data architecture (DRDA). Those skilled in the art, however, will recognize that the invention may be implemented using a variety of computing platforms and/or network architectures.

In one embodiment, the first station 12A includes a query explain program 50. The query explain program 50 is preferably a tool that assists a user in visualizing or otherwise understanding query explain data for one or more queries to be executed. As described above, the query explain data includes, in one embodiment, access path data, statement cost data, and object statistics data used in analyzing and improving the performance of SQL statements.

The second station 12B preferably stores a database 52, as well as an RDBMS 54 for managing the database 52, such as DB2® for OS/390®, available from IBM. As used herein, the term "database" may generically refer to a combination of the RDBMS 54 and the database 52. In one embodiment, a query explain program 50 and the RDBMS 54 are linked via an interface module 56, such as DB2 Connect®, also available from IBM.

Figure 3:
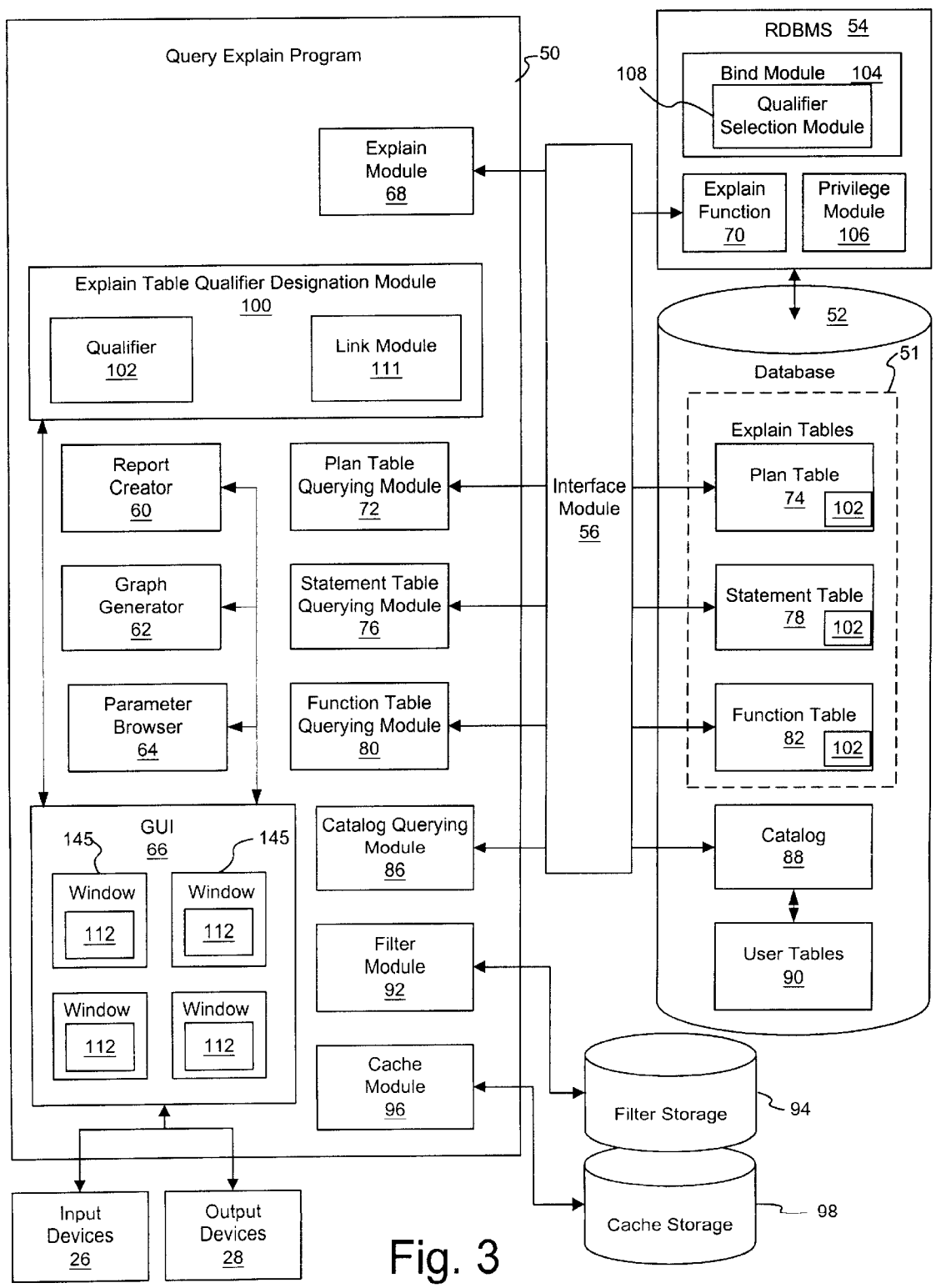
FIG. 3 is a schematic block diagram of a query explain program according to one embodiment of the invention.

Referring now to FIG. 3, the query explain program 50 preferably includes a plurality of modules containing executable and operational data suitable for operation within the memory devices 18 of FIG. 1. Of course, the memory devices in which the modules of the present invention are located may also be distributed across both local and remote computer stations 12. Likewise, two or more illustrated modules may be integrated into a single module, or the function of a single module could be performed by a group of modules, without departing from the scope of the invention.

The principal components of the query explain program 50 include a report creator 60, a graph generator 62, and a parameter browser 64. The above-described modules are, in one embodiment, intended to help the user to better understand the query explain data, subsystem parameters, and the like, in a variety of ways.

For example, the report creator 60 in one embodiment selectively prepares a report of the access path data, statement cost data, and object statistics data in an easily understood, text-based format. The user may be provided with the option of selecting one or more query statements, as well as subsets of the query explain data for the selected query statements to include in the report. The report provides the user with the requested query explain data in a centralized and readily understood format, allowing the user to efficiently analyze and improve SQL query performance. The report creator 60 is more fully described in co-pending U.S. application Ser. No. 09/482,595, filed Jan. 13, 2000, using Express Mail Label EL409135377US, for "System and Method for Selectively Preparing Customized Reports of Query Explain Data," which is commonly assigned and is incorporated herein by reference.

A second principal component of the query explain program 50 in one embodiment is the graph generator 62, which prepares a graphical representation of the access path of a query statement. The graph generator 62 is more fully described in co-pending application Ser. No. 08/949,636 now U.S. Pat. No. 6,243,703, filed Oct. 14, 1997, for "Interpreting Data Using a Graphical User Interface," which is incorporated herein by reference. FIG. 4 illustrates an exemplary SQL query statement, processed by an RDBMS 54 to generate access path data as shown stored within a plan table 74 according to one embodiment of the present invention.

Figure 5:
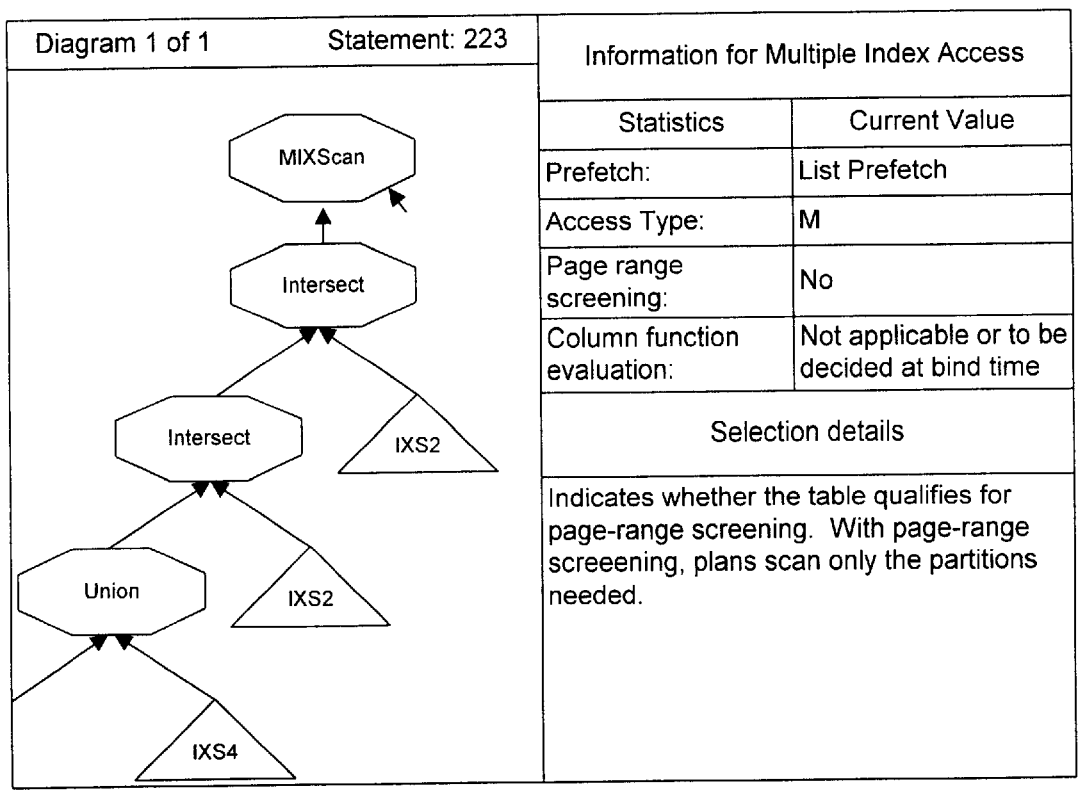
FIG. 5 is an illustration of a graphical representation of an access path according to one embodiment of the invention.

As shown in FIG. 5, the graph generator 62 in one embodiment uses the plan table 74 to generate a graphical representation of the access path. Preferably, access path steps of an SQL statement are graphically represented as nodes within a tree-like structure. Tables, indexes, and operations are graphically represented with unique symbols that indicate the item being represented. For example, rectangles represent tables, triangles represent indexes, and octagons represent operations such as table space scans, index scans, joins, etc. The graphical representation shows the relationship between the database objects and the operations. When the user selects a node of the graphical representation, detailed information related to the selected node is displayed on the right side of the display.

Referring again to FIG. 3, a third principal component of the query explain program 50 in one embodiment is the parameter browser 64. Preferably, the parameter browser 64 allows a user to selectively view the subsystem parameters, for example, DSNZPARM and DSNHDECP values, used by a subsystem, as well as the install panel names and fields. Access to subsystem parameters is useful in to analyzing the performance of query statements. Like the graph generator 62, the parameter browser 64 is more fully described in co-pending application Ser. No. 08/949,636 now U.S. Pat. No. 6,243,703, filed Oct. 14, 1997, for "Interpreting Data Using a Graphical User Interface."

The report creator 60, graph generator 62, and parameter browser 64 are each preferably coupled to a graphical user interface (GUI) module 66. Preferably, the GUI module 66 is operably coupled to the input and output devices 26, 28 to allow the user to interact with the report creator 60, graph generator 62, and parameter browser 64.

The query explain program 50 in the depicted embodiment also includes an explain module 68, which invokes a corresponding explain function 70 in the RDBMS 54. When invoked, the explain function 70 causes the RDBMS 54 to generate function data, access path data, and the statement cost data (referred to herein as "explain data") for a specified query statement.

Explainable query statements include SELECT (except for SELECT INTO) and INSERT statements, and the searched form of UPDATE and DELETE statements. The explain module 68 is used to invoke an explain function 70 in which the RDBMS 54 immediately generates explain data for a specific SQL statement. This feature is useful for interactively testing specified SQL statements. Alternatively, the RDBMS 54 generates the explain data at bind time in the context of an application or package upon encountering an EXPLAIN(YES) open of the BIND command.

In one embodiment, the query explain program 50 includes a plurality of querying modules for querying various tables in the database 52. For example, a plan table querying module 72 queries a plan table 74 to obtain access path data. Likewise, a statement table querying module 76 queries a statement table 78 to obtain statement cost data. A function table querying module 80 queries a function table 82 to obtain data concerning user-defined functions. The plan table 74, the statement table 78, and the function table 82 are collectively referred to herein as "explain tables." Finally, a catalog querying module 86 queries the RDBMS catalog 88 to obtain object statistics for one or more database objects contained within a plurality of user tables 90.

Although the querying function is implemented herein by four separate modules, those skilled in the art will recognize that the described functionality may be implemented by fewer modules. Additionally, in one embodiment, the above-described modules use the interface module 56 when communicating with the RDBMS 54 and database 52.

Preferably, the query explain program 50 also includes a filter module 92. In one embodiment, the filter module 92 allows a user to filter a list of explainable query statements according to various user-selected criteria, including statement costs, references to particular database objects, and the inclusion of particular steps in the access paths of the statements. Moreover, in one embodiment, the user may assign a name to a set of filtering criteria and save the named set in a filter storage 94. This allows the user to easily retrieve a specified set of filtering criteria such that only the explainable query statements satisfying the criteria are listed.

In one embodiment, the filter module 92 also allows a user to filter a set of plans and packages according to various identification data, such as plan and package names, collection identifiers, version identifiers, and the like. The filter module 92 is in one embodiment accessed and interfaced by a user through the GUI to with an access path filtering window 110 of FIG. 6. One embodiment of the operation of the filter module will be described in greater detail below with respect to FIG. 6.

The query explain program 50 also preferably includes a cache module 96, which caches portions of the above-described tables in a cache storage 98. For example, when the plan table querying module 72 retrieves access path data from the plan table 74, the access path data is preferably stored, and future accesses to the same data will be retrieved from the cache storage 98. Various methods may be employed for managing data in the cache storage 98, such as automatically deleting a percentage of the cached data when the amount of the data exceeds a pre-defined threshold.

An explain table qualifier designation module 100 is also preferably included in the query explain program 50 and is preferably configured to allow a user to designate a qualifier 102 of an explain table 51 that the user wishes to reference. Thus, the user may reference a selected query explain table 51 in conjunction with the various modules of the query explain program 50 to perform the function of the module in conjunction with the selected query explain table.

As discussed above, in prior art arrangements, each user was assigned a user code, and that user code was appended to tables created and assigned by a bind module 104 to tables 51 generated by a user. If the user wished to reference tables that did not have user's user code, the user was forced to log out and log in under the user code of the tables that were desired to be referenced.

Under the present invention, the explain table qualifier designation module 100, preferably in conjunction with the GUI 66, allows the user to designate any explain table 51 that the user wishes to reference, so long as the user has the required privileges. Once the user selects a desired qualifier 102 corresponding to is a selected explain table 51, a privilege module 106 preferably makes the determination whether or not the user has the required privileges to access the selected explain tables 51. In the depicted embodiment, the qualifier module is shown as a component of the explain table qualifier designation module 100, and while the qualifier module 102 is preferably linked thereto, it does not have to be part of the explain table qualifier designation module 100.

The query explain program 50 is also shown provided with a qualifier assignment module 108. At bind time, a default qualifier is preferably assigned by the qualifier assignment module 108 to the explain tables 51 generated by a user. Those tables may become the default tables of that user and if the user does not specify other explain tables 51 to reference, those tables 51 are referenced.

With the qualifier assignment module 108, a user is allowed to select a custom qualifier to be assigned to query explain tables. In one embodiment, the custom qualifier is assigned to user-made copies of query explain tables 51. In a further embodiment, the qualifier assignment module assigns a default qualifier 102 when a bind module 104 binds the query explain tables to the plans and packages being generated. Additionally, the bind module 104 preferably allows the user to specify the custom qualifier the user wishes to assign to the query explain tables 51.

Figure 6:
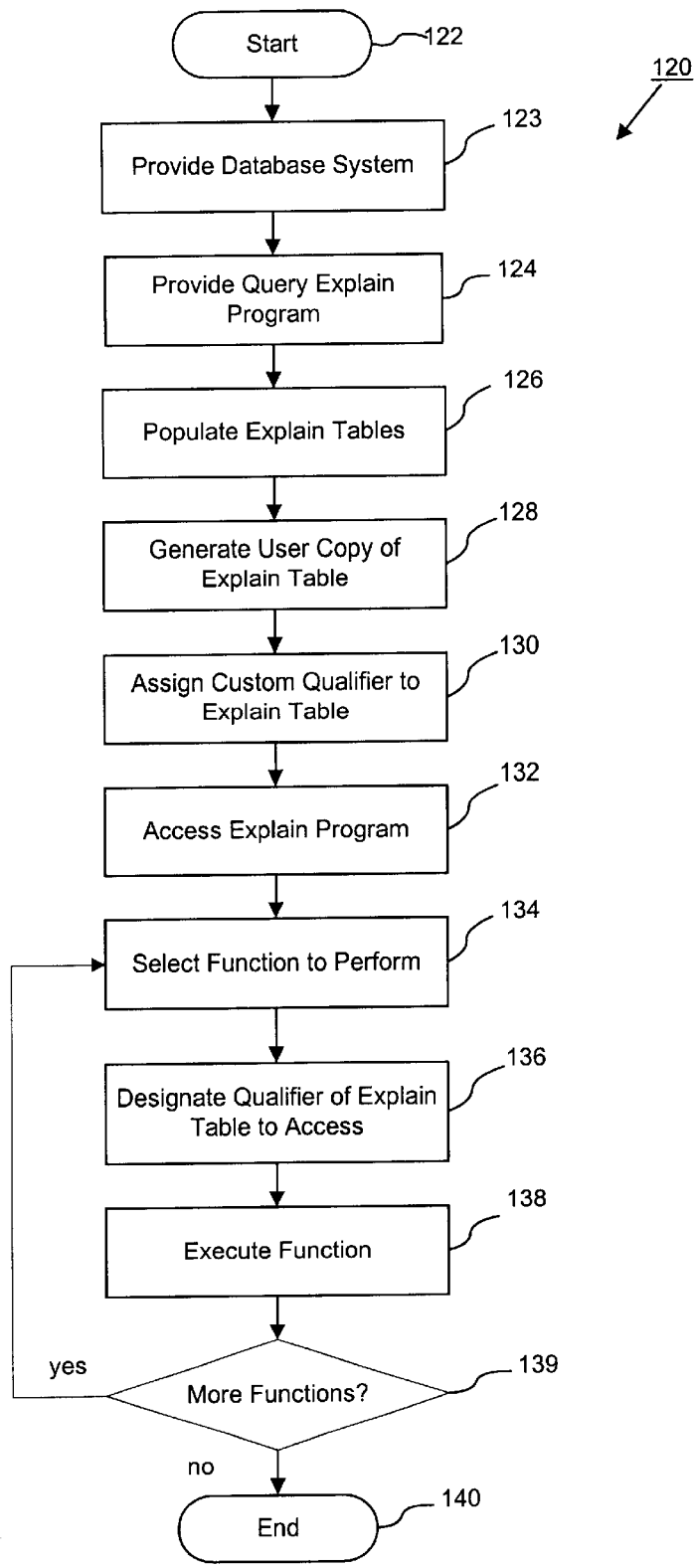
FIG. 6 is a flow chart block diagram illustrating one embodiment of the method of the present invention.

FIG. 6 is a schematic flow chart diagram illustrating one embodiment of a method 120 of accessing an explain table within an explain program by referencing a qualifier of the explain program. The method 120 begins at a start step 122 and progresses to a step 124. At the step 124, a query explain program such as the program 50 of FIG. 3 accesses a database system. In one embodiment, the database system is configured in the manner described for the database system 54 of FIG. 3. Programs and/or queries of the database system 54 are then referenced and explain tables 51 are generated and populated at a step 126, preferably in the manner described above.

At a step 128, user copies of the explain tables 51 may be generated. At a step 130, qualifiers 102 are assigned to each of the explain tables. In one embodiment, a qualifier 102 is assigned by default to an explain table 51 at the time of binding by the bind module 104. The qualifier 102 may be assigned by default and may correspond to the user's identification code. The qualifier is preferably a high level qualifier as described above. Alternatively, user may utilize a qualifier assignment module 108 and assign a custom qualifier to the explain table 51. In a further embodiment, the explain table 51 may be the user copy generated at the step 128.

At a step 132, a user accesses the query explain program 50. At a step 134, the user selects a function of the query explain program to perform. This function preferably corresponds to the function of one of the modules described as being part of the query explain program in conjunction with the discussion above. At a step 136, the user designates a qualifier of an explain table to access. Preferably, the qualifier is other than a default qualifier assigned previously. Additionally, the qualifier is preferably a high level qualifier.

At a step 138, the function for which the explain table 51 was referenced is executed. Examples of manners of referencing explain tables 51 through designation of a selected qualifier 102 are given below. At a step 140, the method 120 ends.

Figure 7:
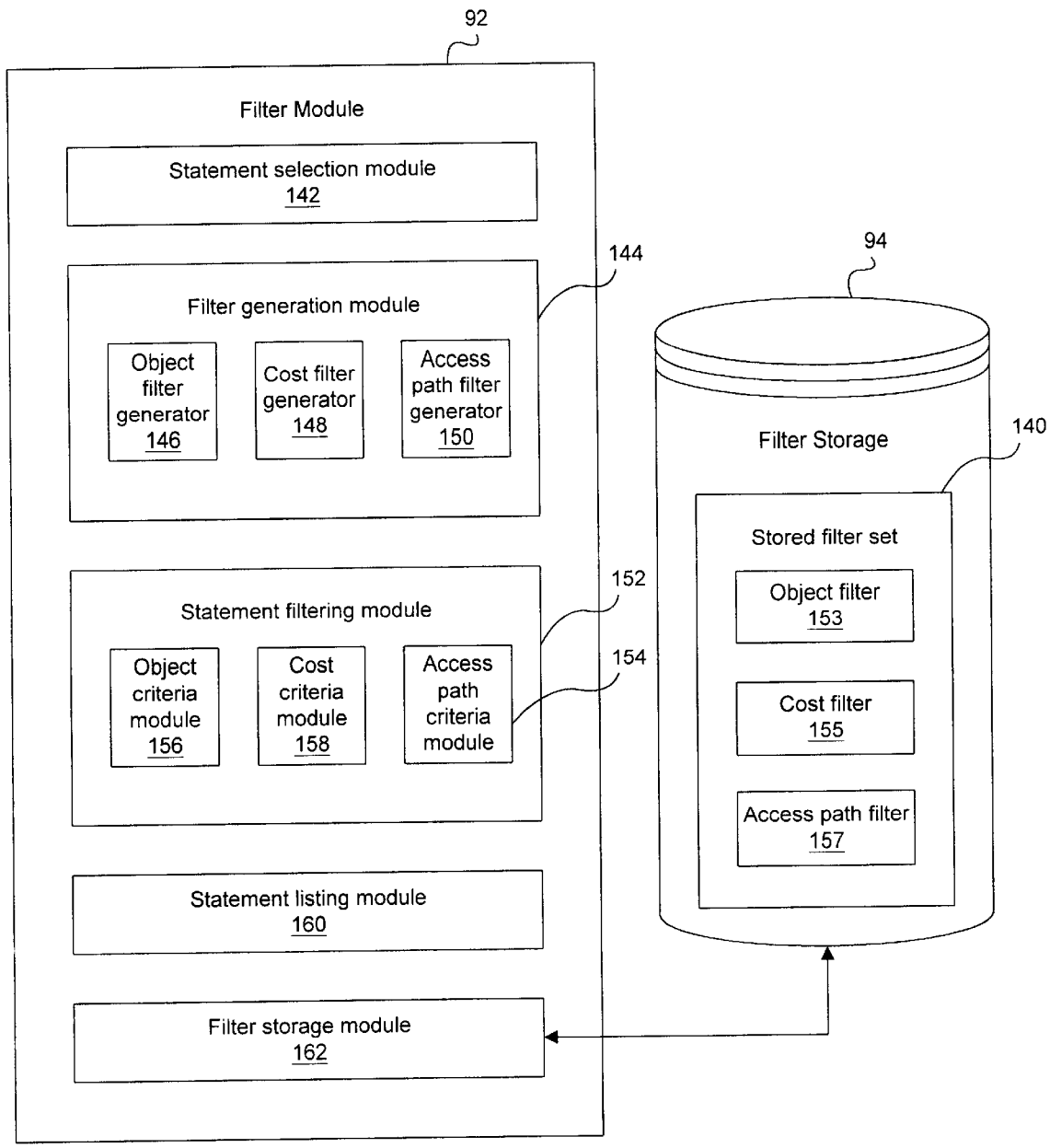
FIG. 7 is a schematic block diagram illustrating one embodiment of a filter to module in accordance with one embodiment of the present invention.

FIG. 7 is a schematic block diagram illustrating one embodiment of a filter module 92 in accordance with one embodiment of the present invention. The filter module 92 preferably includes a plurality of modules containing executable and operational data suitable for operation within the memory devices 18 of FIG. 1. In one embodiment, the memory devices 18 in which the modules of the present invention are located may also be distributed across both local and remote computer stations 12. Likewise, two or more illustrated modules may be integrated into a single module without departing from the scope of the invention, and additional modules could be utilized to perform the same functions.

In one embodiment, the filter module 92 includes a statement selection module 142, which allows a user to select an initial set of query statements to be filtered. Briefly, a package comprises one or more query statements from a common application. Likewise, a plan is an assemblage of query statements, but may correspond to more than one application. The user may preferably select one or more plans or packages to create the initial set of query statements.

To alleviate this problem, the filter module 92 preferably includes a filter generation module 144. In one embodiment, the filter generation module 144 allows the user to create one or more filters for selectively reducing a list of query statements based on subsets of the query explain data previously generated for the statements by the RDBMS 54. In the depicted embodiments, each filter includes user-specified filtering criteria that are applied to the corresponding subset of the query explain data to selectively exclude from the initial set the query statements not satisfying the filtering criteria.

The filter generation module 144 preferably includes an object filter generator 146 for assisting a user in generating a user-defined object filter 145. In one embodiment, the object filter 145 includes filtering criteria for selectively excluding query statements from the initial set based on whether the query statements either reference a specified database object (such as a table, index, or the like) or reference an object created by a specified person.

Similarly, the filter generation module 144 also includes, in one embodiment, a cost filter generator 148 for assisting a user in generating a user-defined cost filter 155. The cost filter 155 preferably includes filtering criteria for selectively excluding query statements from the initial set based on how the statement cost data for each query statement compares with a specified threshold cost.

Likewise, the filter generation module 144 preferably includes an access path filter generator 150 for assisting a user in generating a user-defined access path filter 157. The access path filter 157 preferably includes filtering criteria for selectively excluding query statements from the initial set based on whether the statements include specified execution steps in their access paths. Other types of filter generators may also be added as needed.

To apply the foregoing filters, the filter module 92 preferably includes a statement filtering module 152. In one embodiment, the statement filtering module 152 applies the filtering criteria of the filters to subsets of the query explain data for the initial set of query statements.

In the depicted embodiment, the statement filtering module 152 includes an object criteria module 156 for applying the filtering criteria of an object filter 145. Preferably, the object criteria module 156 communicates with the plan table querying module 72 to obtain the access path data for each query statement from the plan table 74. From the access path data, the object criteria module 156 may determine whether each statement references a database object specified in the filtering criteria, such as a table, index, or the like.

Additionally, the statement filtering module 152 preferably includes a cost criteria module 158 for applying the filtering criteria of a cost filter 155. In one embodiment, the cost criteria module 158 communicates with the statement table querying module 76 to obtain the statement cost data for each query statement from the statement table 78. From the statement cost data, the cost criteria module 158 may determine whether each statement satisfies the filtering criteria of the cost filter 155.

In one embodiment, the statement filtering module 152 also includes an access path criteria module 154 for applying the filtering criteria of an access path filter 157. Preferably, the access path criteria module 154 communicates with the plan table querying module 72 to obtain the access path data for each query statement from the plan table 74. From the access path data, the access path criteria module 154 may determine whether the access path of each statement includes execution steps specified in the filtering criteria of the access path filter 157.

In one embodiment, the filter module 92 also includes a statement listing module 160. The statement listing module 160 preferably displays the filtered set of query statements to the user, additionally allowing the user to select one or more of the query statements for purposes of modifying the statements, including the statements in a report, explaining the query statements, or the like.

In one embodiment, the filter module 92 also includes a filter storage module 162. After the user has generated one or more filters, the filter storage module 162 preferably allows the user to store the filters as a set 140 in the filter storage 94. In one embodiment, the user may assign a name to a set 140 of filters in the filter storage 94. Later, the user may retrieve and use the stored filters without having to recreate them.

Figure 8:
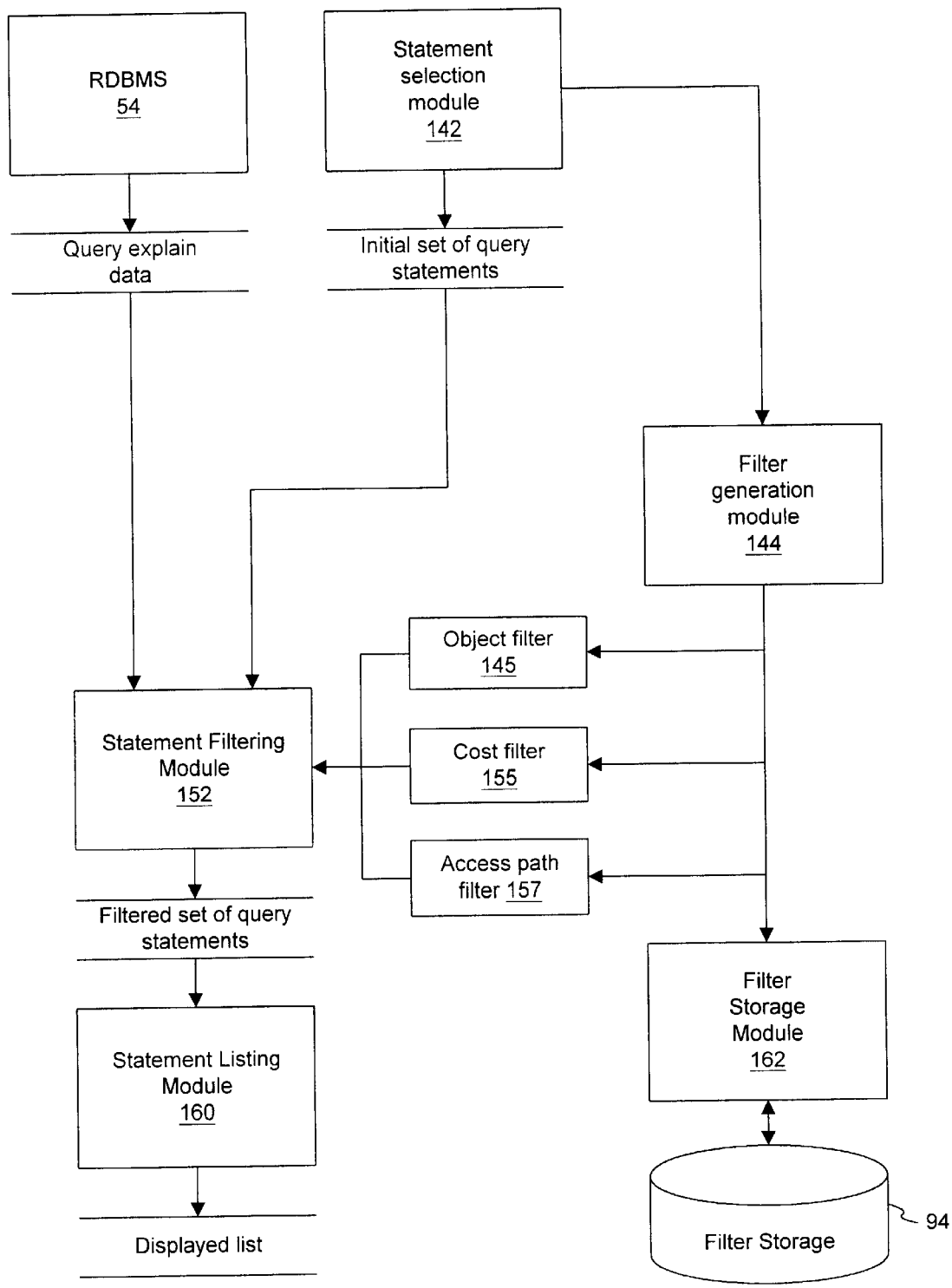
FIG. 8 is an illustration of the data flow within the filter module 92 according to one embodiment of the invention.

FIG. 8 is an illustration of the data flow within the filter module 92 according to one embodiment of the invention. As described above, the RDBMS 54 generates query explain data for a plurality of query statements. Using the statement selection module 100, the user may select one or more plans and/or packages, which define an initial set of query statements to be filtered.

A user may, using the filter generation module 102, generate one or more filters, such as an object filter 106, a cost filter 110, and an access path filter 114. Optionally, the filters may be stored in the filter storage 94 by means of the filter storage module 126. Later, a user may retrieve the filters from the filter storage 94. In one embodiment, the filters may include the user's selection of the plans and/or packages.

In one embodiment, the statement filtering module 116 accepts as input the initial set of query statements, the query explain data for the statements, and one or more user-defined filters, either generated by the filter generation module 102 or retrieved from the filter storage 94. Using the techniques described above, the statement filtering module 116 applies the filtering criteria of each user-defined filter to selectively exclude from the initial set the query statements not satisfying the filtering criteria. Preferably, the statement filtering module 116 provides the filtered query statements to the statement listing module 160, which displays a list of the filtered query statements to the user.

Figure 9:
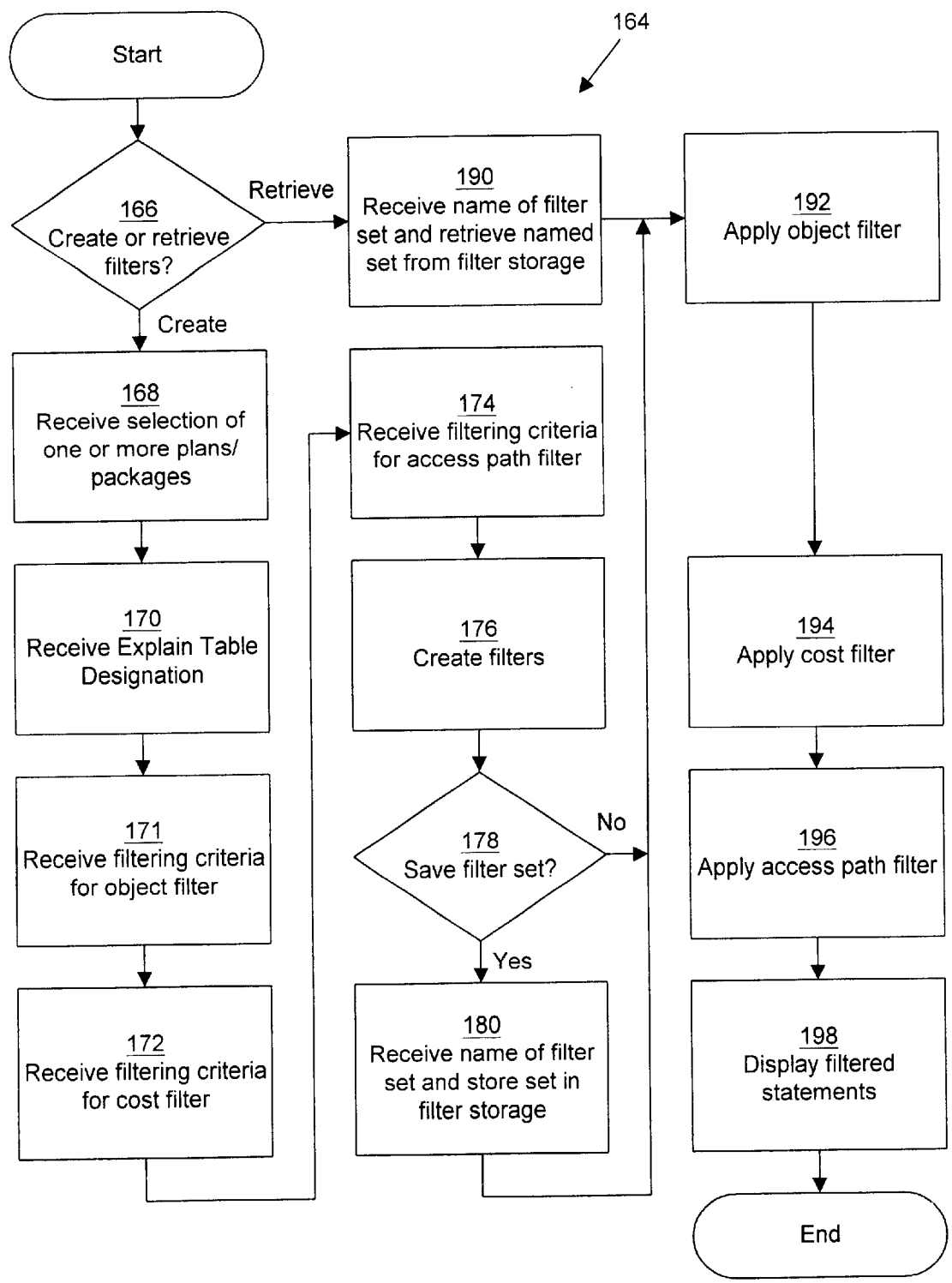
FIG. 9 is a schematic flow chart illustrating a method of filtering query statements according to one embodiment of the invention.

Referring now to FIG. 9, a schematic flow chart illustrates a method of filtering query statements according to one embodiment of the invention. The method begins by determining 166 whether to create new filters or to retrieve a set 130 of stored filters. In the depicted embodiment, a user may create new filters by selecting a "new" button 146 or a similar control. Alternatively, a user may retrieve a set 130 of filters from the filter storage 94 by selecting the name of a set 130 from a pull-down menu 148, which lists the names of the filter sets 130 stored in the filter storage 94.

If, in step 166 of FIG. 8, the user elects to create new filters, the method continues by receiving 134 a user's selection of one or more plans and/or packages. As noted above, a package corresponds to one or more query statements in a common application. Likewise, a plan is an assemblage of query statements, but may correspond to more than one application.

Figure 10:
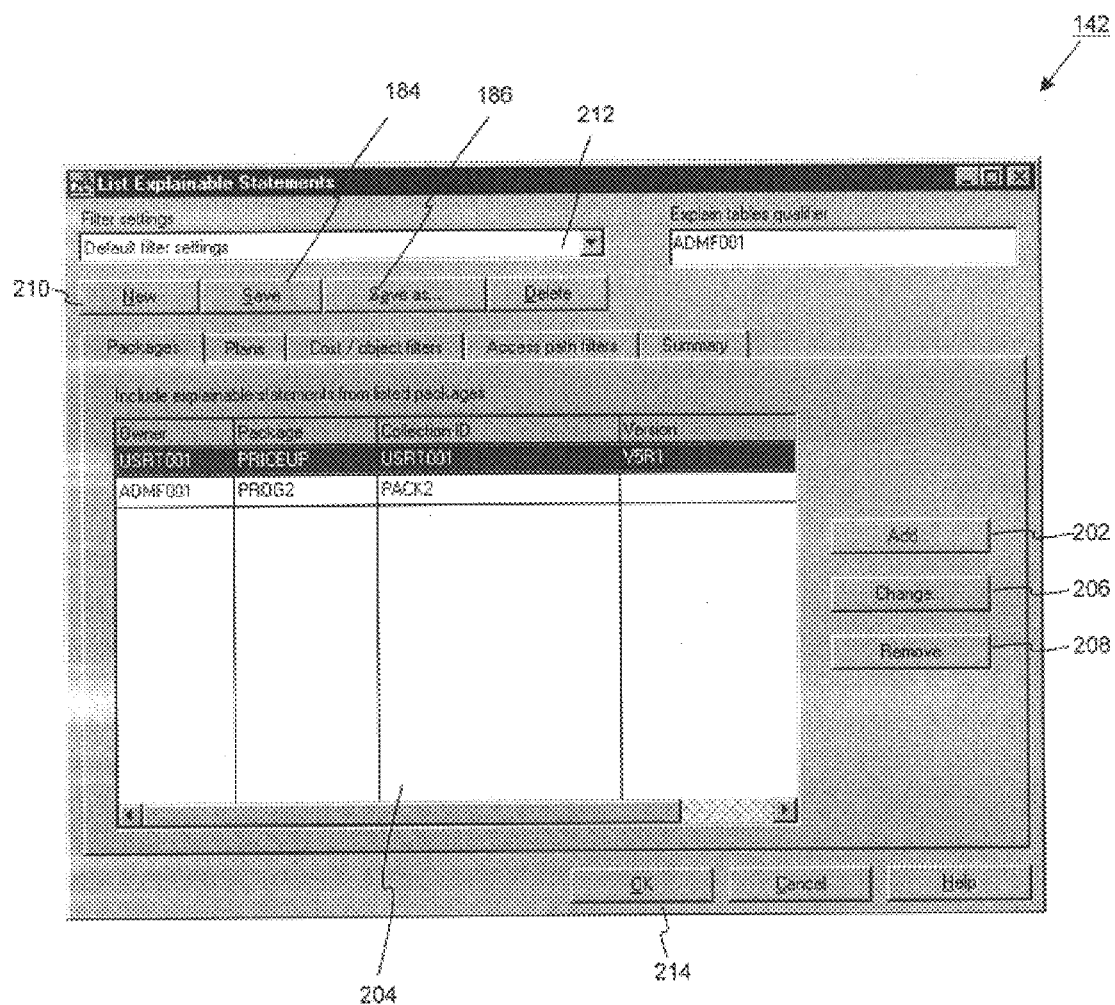
FIGS. 10 and 11 illustrate interactive displays for selecting packages and plans according to one embodiment of the invention.
Figure 11:
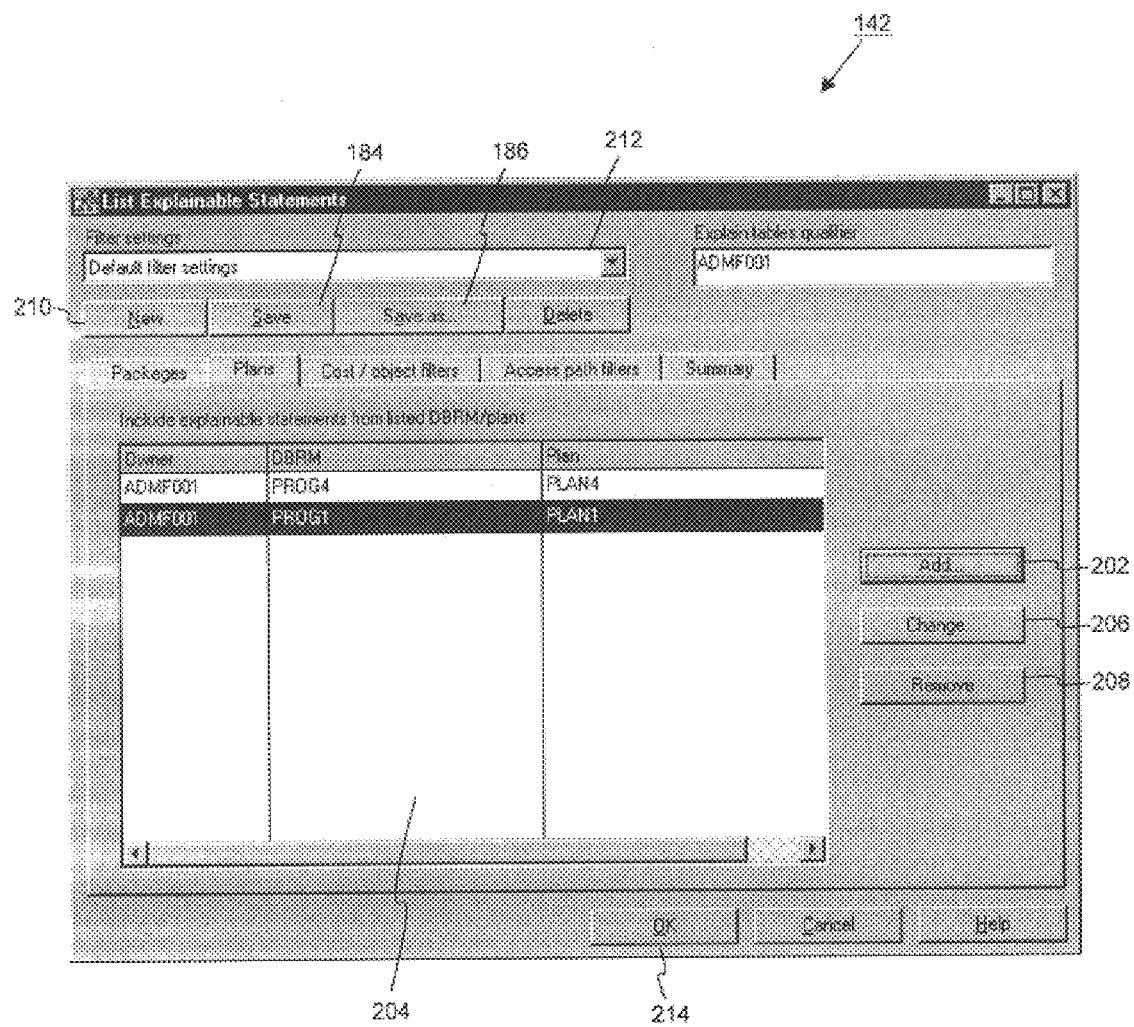

FIGS. 10 and 11 are illustrations of interactive displays or windows 142, generated by the statement selection module 100 for receiving a user's selection of one or more plans and/or packages. FIG. 10 illustrates an interactive display for selecting packages according to one embodiment of the invention. Preferably, the statement selection module 100 is provided with a control 200 for selecting an explain table qualifier 102. In the depicted embodiment, the control 200 comprises a text box. The text box in one embodiment initially lists the explain tables 51 assigned to the user's default user code, but is also configured to receive alternate selections by a user. Thus, a user can elect to reference the default explain tables, or may reference an alternate selected table 51 by listing the qualifier of that table 51. The contents of the selected table are then referenced according to selected access path choices made by the user. The selected explain tables 51 are referenced by the filter module 92 and the plans or packages therein become the basis upon which explainable statements are displayed.

The display 142 also provides an "add" button 134, or a similar control, through which the user may select to add one or more packages to a selected package list 136. In one embodiment, the user may add packages by name or by performing a search of the packages based on such criteria as package owner, package name, collection ID, and version.

In one embodiment, the selection module 100 employs a control such as a "change" button 138 for changing one or more of the selected packages in the selected package list 136. In addition, the selection module 100 may include a "remove" button 140 or similar control for removing one or more of the selected packages.

FIG. 11 illustrates an interactive display for selecting plans according to one embodiment of the invention. The display 142 of FIG. 11 is also provided with a control 200 for selecting a qualifier of explain tables 51 which the user wishes to reference. Once again, the plans for which statements are stored in the referenced explain tables 51 become the basis for which statements are displayed. Preferably, the selection module 100 provides a control such as an "add" button 134 for adding one or more plans to a selected plan list 142. As noted above, a plan is similar to a package but may include query statements for more than one application.

Thus, at a step 170, the user designates the qualifier 102 of the query explain table 51 to be referenced. After the user's selection of plans and/or packages is received, the method continues by receiving 171 user-specified filtering criteria, if any, for an object filter 106. It should be recognized that a user is not required in one embodiment to create a complete set of filters or, indeed, any filters. Thus, if the user selects an "OK" button 152 (of FIG. 10) or the like without creating any filters, a statement listing module 160 (of FIG. 10) preferably lists all of the query statements in the selected plans and/or packages.

After the filtering criteria for the object filter 106 is received, the method continues by receiving 174 filtering criteria, if any, for a cost filter 110. FIG. 14 is an illustration of an interactive display provided by the cost filter generator 108 for receiving user-specified filtering criteria of a cost filter 110. Preferably, the interactive display for the cost filter generator 108 may be selectively displayed by of the "Cost / object filters" tab 153.

After the filtering criteria for the cost filter 110 is received, the method continues by receiving 174 filtering criteria, if any, for an access path filter 114. In one embodiment, the access path filter generator 112 displays a plurality of customizable boolean expressions 176. Preferably, each of the boolean expressions 176 represents access path steps. For example, as depicted in FIG. 16, the access path steps may include sorts, table space scans, and the like.

After the filtering criteria for the access path filter 114 is received, the method continues by creating 176 the filters corresponding to the user-defined filtering criteria. In one embodiment, the filters are data structures including representations of the relational expressions 154, 170 and boolean expressions 176. In addition, each filter may include, in one embodiment, the selection of plans and/or packages made by the user in step 174. The type of data structure is not crucial to the invention. However, it is preferred that the statement filtering module 116 is capable of interpreting the data structures to obtain the relational expressions 154, 170 and boolean expressions 176, for the filtering criteria, as well as the plan/package selection.

After the filters are created, the method continues by determining 178 whether to save the user-specified filter(s) as a set 130 in the filter storage 94. The user may elect (or may have previously elected) to give a name to a set 130 of filters and store the set 130 by means of the "Save" or "Save as" buttons 184, 186.

If the user selects one of the foregoing buttons 184, 186, the method continues with step 180 by receiving the name of the filter set 130 (if not previously provided) and storing the filter set 130 in the filter storage 94 using the specified name; otherwise, the method continues with step 192.

As previously noted in step 174, a user may elect to retrieve a stored filter set 130, rather than creating new filters by means of the filter generation module 102. This is accomplished, in one embodiment, by selecting a set 130 from a pull down menu 148, which lists the names of the filter sets 130 stored in the filter storage 94. Thus, if the user elects to retrieve a stored set in step 174, the method continues by receiving 190 a name of a user-specified filter set 130 and retrieving the set 130 from the filter storage 94.

In one embodiment, the user may elect to modify the retrieved filter 190 of using the techniques described in steps 170, 174, and 174. As noted above, the filters may include, in one embodiment, the selection of plans and/or packages made by the user in step 174. However, in an alternative embodiment, the user may proceed to specify a new or different set of plans and/or packages as described in step 166.

After the completion of either steps 178, 180, or step 190, one or more filters have been generated and/or retrieved. Preferably, the user requests a list of filtered statements by selecting the "OK" button 152. Thereafter, the method continues by applying 192 the object filter 106, if any, to the query statements. After the object filter 106 is applied, the method continues by applying 194 the cost and access path filters 110, 114 if any were defined. When the filtering process is complete, the statement listing module 160 displays a list of the filtered query statements to the user.

Additionally, in one embodiment, the statement listing module 160 allows the user to select a filtered statement for graphing, for SQL text display, for generation of a report containing the statement, or the like.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of accessing a user-selectable query explain table, the method comprising:

providing a query explain program configured to supplement a relational database management system (RDBMS) by providing a user with a further clarification of query explain data generated by an explain function of the RDBMS;

receiving within the query explain program a user selection of a high level qualifier; and responding to the user selection of the high level qualifier by referencing query explain data associated with the high level qualifier without requiring the user to be logged in under the high level qualifier.

2. The method of claim 1, further comprising generating a query explain table and allowing a user to assign to the query explain table the high level qualifier.

3. The method of claim 1, wherein the query explain data is located within a query explain table selected from the group consisting of a plan table, a statement table, and a function table.

4. The method of claim 1, wherein referencing the query explain data comprises automatically referencing a query explain table in order to achieve a function of the query explain program.

5. The method of claim 4, wherein the function comprises graphically displaying query access path data to the user in order to make a query path more readily understandable to the user.

6. The method of claim 1, further comprising generating a graphical user interface (GUI) window accessible from the query explain program, the GUI window comprising a control mechanism for receiving the user selection of a high level qualifier.

7. The method of claim 1, wherein receiving a user selection of a high level qualifier comprises receiving a high level qualifier uniquely identifying a selected query explain table.

8. The method of claim 7, wherein the high level qualifier designates a maker of the query explain table.

9. An article of manufacture comprising a program storage medium readable by a processor and embodying one or more instructions executable by the processor to perform a method of accessing a user-selectable query explain table, the method comprising:

providing a query explain program configured to supplement a relational database management system (RDBMS) by providing a user with a further clarification of query explain data generated by an explain function of the RDBMS;

receiving within the query explain program a user selection of a high level qualifier; and responding to the user selection of the high level qualifier by referencing query explain data associated with the high level qualifier without requiring the user to be logged in under the high level qualifier.

10. The article of manufacture of claim 9, further comprising generating a query explain table and allowing a user to assign to the query explain table the high level qualifier.

11. The article of manufacture of claim 9, wherein the query explain data is located within a query explain table selected from the group consisting of a plan table, a statement table, and a function table.

12. The article of manufacture of claim 9, wherein referencing the query explain data comprises automatically referencing a query explain table in order to achieve a function of the query explain program.

13. The article of manufacture of claim 9, wherein the method further comprises generating a graphical user interface window accessible from the query explain program, the window comprising a control mechanism for receiving the user designated high level qualifier.

14. The article of manufacture of claim 9, wherein receiving a user selection of a high level qualifier comprises receiving a high level qualifier uniquely identifying a selected query explain table.

15. The article of manufacture of claim 9, wherein the high level qualifier designates a maker of the query explain table.

16. A system for accessing a user-selectable query explain table, the system comprising:

a query explain program configured to operate remote to a relational database management system (RDBMS) and to assist a user in understanding query explain data generated by the RDBMS, the query explain program further configured to access one or more query explain tables generated by the RDBMS; and an explain table qualifier designation module within the query explain program, the explain table qualifier designation module configured to receive a user designation of a selected query explain table to be accessed by the query explain program.

17. The system of claim 16, further comprising an explain table access module configured to access the selected query explain table in response to the user designation.

18. The system of claim 16, wherein the user designation of the selected query explain table comprises the designation of a high level qualifier uniquely identifying the selected query explain table.

19. The system of claim 18, wherein the high level qualifier identifies a maker of the explain table.

20. The system of claim 16, wherein the explain table qualifier designation module comprises a window accessible from the query explain program, the window comprising a control mechanism for receiving the user designation of a selected query explain table.

21. The system of claim 16, wherein the query explain table is selected from the group consisting of a plan table, a statement table, and a function table.

22. The system of claim 16, wherein the query explain table is configured to be accessed by the query explain program for a plurality of different functions, including graphically displaying query access path data to the user.

* * * * *

UNITED STATES PATENT AND TRADEMARK OFFICE
CERTIFICATE OF CORRECTION

PATENT NO.    : 6,493,700 B2
DATED         : December 10, 2002
INVENTOR(S)   : Tanya Couch et al.

It is certified that error appears in the above-identified patent and that said Letters Patent is hereby corrected as shown below:

Title page,
Item [57], ABSTRACT,
Line 3, "statements" should read -- statement query data --.

Drawings,
Figure 7, "Stored filter set 140" should read -- Stored filter set 130 --.
Figure 8, "Object filter 145" should read -- Object filter 153 --.
Figures 10 and 11, number "142" should read -- 145 --.

Column 3,
Line 10, "designating" should read -- designate --.
Line 15, "labels" should read -- label --.

Column 5,
Line 9, "filter to module" should read -- filter module --.
Line 47, "and/ or" should read -- and/or --.

Column 6,
Line 34, "devices 28" should read -- devices 28, --.
Line 65, "first station" should read -- first station 12A --.
Line 66, "an PC" should read -- a PC --.

Column 8,
Line 24, "in to analyzing" should read -- in analyzing --.
Line 52, "open" should read -- option --.

Column 9,
Line 1, "by" should read -- by more or --.
Line 22, "GUI to with" should read -- GUI with --.
Line 23, "110 of FIG. 6" should be omitted from the text.
Line 56, "to is a" should read -- to a --.
Line 66, "assignment" should read -- selection --.

Column 10,
Line 2, "assignment" should read -- selection --.
Line 6, "assignment" should read -- selection --.
Line 20, the first "step 124" should read -- step 123 --.

Column 11,
Lines 23, 24 and 51, "object filter 145" should read -- object filter 153 --.

UNITED STATES PATENT AND TRADEMARK OFFICE
CERTIFICATE OF CORRECTION

PATENT NO. : 6,493,700 B2
DATED : December 10, 2002
INVENTOR(S) : Tanya Couch et al.

It is certified that error appears in the above-identified patent and that said Letters Patent is hereby corrected as shown below:

Column 12,
Lines 21 and 23, "set 140" should read -- set 130 --.
Line 30, "selection module 100" should read -- selection module 142 --.
Lines 33 and 44, "generation module 102" should read -- generation module 144 --.
Line 34, "object filter 106" should read -- object filter 153 --.
Line 35, "cost filter 110" should read -- cost filter 155 --.
Line 35, "access path filter 114" should read -- access path filter 157 --.
Line 37, "storage module 126" should read -- storage module 162 --.
Lines 41 and 46, "filtering module 116" should read -- filtering module 152 --.
Line 50, "module 116" should read -- module 152 --.
Line 58, "button 146" should read -- button 210 --.
Line 61, "pull-down menu 148" should read -- pull-down menu 212 --.
Line 63, "FIG. 8" should read -- FIG. 9 --.
Line 64, "receiving 134" should read -- receiving 168 --.

Column 13,
Line 5, "windows 142" should read -- windows 145 --.
Line 6, "100" should read -- 142 --.
Lines 9, 29, 32, and 42, "selection module 100" should read -- selection module 142 --.
Lines 10, 11 and 37 "control 200" should read -- control 210 --.
Lines 23 and 37, "displays 142" should read -- displays 145 --.
Lines 23 and 43, "button 134" should read -- button 202 --.
Line 25, "package list 136" should read -- package list 204 --.
Line 30, "button 138" should read -- button 206 --.
Line 32, "136" should read -- 204 --.
Line 33, "button 140" should read -- button 208 --.
Line 44, "list 142" should read -- button 204 --.
Lines 50 and 57, "object filter 106" should read -- object filter 153 --.
Line 53, "button 152" should read -- button 214 --.
Line 55, "FIG. 10" should read -- FIG. 7 or 8 --.
Line 58, "receiving 174" should read -- receiving 172 --.
Line 59, "cost filter 110" should read -- cost filter 155 --.
Line 59, "FIG. 14 is an illustration" should be omitted from the text.
Line 60, "of an" should rea -- An --.
Line 60, "display provided" should read -- display may be provided --.
Line 61, "108" should read -- 148 --.
Line 62, "filter 110" should read -- filter 155 --.
Line 63, "generator 108 may be" should read -- generator 148 is --.
Line 63, "of the" should read -- a --.
Line 64, "153" should be omitted from the text.
Line 65, "cost filter 110" should read -- cost filter 155 --.

UNITED STATES PATENT AND TRADEMARK OFFICE
CERTIFICATE OF CORRECTION

PATENT NO. : 6,493,700 B2
DATED : December 10, 2002
INVENTOR(S) : Tanya Couch et al.

It is certified that error appears in the above-identified patent and that said Letters Patent is hereby corrected as shown below:

<u>Column 14,</u>
Lines 1 and 7, "access path filter 114" should read -- access path filter 157 --.
Line 2, "filter generator 112" should read -- filter generator 150 --.
Lines 3, 4, 12, and 18, "176" should be omitted from the text.
Line 5, "as depicted in FIG. 16," should be omitted from the text.
Line 11, "of the relational" should read -- of relational --.
Line 11, "154, 170" should be omitted from the text.
Line 14, "step 174" should read -- step 168 --.
Line 16, "filtering module 116" should read -- filtering module 152 --.
Line 17, "154, 170" should be omitted from the text.
Line 31, "step 174" should read -- step 166 --.
Line 33, "generation module 102" should read -- generation module 144 --.
Line 35, "pull down menu 148" should read -- pull down menu 212 --.
Line 37, "step 174" should read -- step 166 --.
Line 41, "of using" should read -- using --.
Line 42, "170, 174, and 174" should read -- 171, 172, and 174 --.
Line 44, "step 174" should read -- step 168 --.
Line 51, "button 152" should read -- button 214 --.
Lines 52 and 53, "object filter 106" should read -- object filter 153 --.
Line 55, "filters 110, 114" should read -- filters 155, 157 --.

Signed and Sealed this

Twentieth Day of May, 2003

JAMES E. ROGAN
*Director of the United States Patent and Trademark Office*